US008419362B2

(12) United States Patent
Bertolotti et al.

(10) Patent No.: US 8,419,362 B2
(45) Date of Patent: Apr. 16, 2013

(54) FOLDABLE BLADES FOR WIND TURBINES

(75) Inventors: Fabio Paolo Bertolotti, South Windsor, CT (US); John DiDomenico, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1738 days.

(21) Appl. No.: 10/930,201

(22) Filed: Aug. 31, 2004

(65) Prior Publication Data

US 2006/0045743 A1    Mar. 2, 2006

(51) Int. Cl.
*F03D 7/04* (2006.01)
(52) U.S. Cl.
USPC .................................. 416/1; 416/23; 416/142
(58) Field of Classification Search ................ 416/1, 23, 416/24, 87, 88, 89, 132 B, 136, 138, 140, 416/142–143, 169 R
See application file for complete search history.

(56) References Cited

U.S. PATENT DOCUMENTS

| 1,403,069 | A | * | 1/1922 | Burne | 416/23 |
| 2,497,040 | A | * | 2/1950 | Williams | 416/143 |
| 3,213,944 | A | * | 10/1965 | Ross et al. | 416/23 |
| 4,310,284 | A | * | 1/1982 | Randolph | 416/132 B |
| 4,952,119 | A | * | 8/1990 | Widseth | 416/3 |
| 5,527,152 | A | * | 6/1996 | Coleman et al. | 416/23 |
| 5,639,215 | A | * | 6/1997 | Yamakawa et al. | 416/23 |
| 6,361,275 | B1 | | 3/2002 | Wobben | |
| 6,454,207 | B1 | * | 9/2002 | Yamakawa et al. | 416/23 |
| 6,474,945 | B1 | * | 11/2002 | Nakasato et al. | 416/23 |
| H2057 | H | | 1/2003 | Veers | |
| 6,619,918 | B1 | | 9/2003 | Rebsdorf | |
| 6,726,439 | B2 | | 4/2004 | Mikhail et al. | |
| 2003/0044274 | A1 | | 3/2003 | Deane | |
| 2003/0138315 | A1 | * | 7/2003 | Brueckner | 415/4.5 |

FOREIGN PATENT DOCUMENTS

| DE | 1016132 A | * | 9/1957 | 416/23 |
| FR | 2526877 A | * | 11/1983 | 416/23 |

OTHER PUBLICATIONS

English translation of French Patent 2,526,877, dated Aug. 2007.*
English translation of German Patent 1,016,132, dated Aug. 2007.*

* cited by examiner

*Primary Examiner* — Christopher Verdier
(74) *Attorney, Agent, or Firm* — Carlson, Gaskey & Olds

(57) ABSTRACT

A turbine blade assembly includes an outboard blade section that folds onto an inboard blade section at a hinge located between the sections. When the outboard blade section is rotating to a folded position a longitudinal axis of the outboard blade section is transverse to a longitudinal axis of the inboard blade section. When the outboard blade section is in a fully folded position, the axes are parallel. The method of folding the outboard blade section includes adjusting the pitch of the turbine blade while it is rotating. Adjusting the pitch changes the pressure on a non-hinge side of the turbine blade and results in the outboard blade section folding with respect to the inboard blade section.

19 Claims, 6 Drawing Sheets

FOLDABLE BLADES FOR WIND TURBINES

BACKGROUND OF THE INVENTION

This invention relates to wind power energy and, more particularly, to foldable turbine blades for simplified transportation in construction of wind towers and reduction of stress loads on the turbine blades during extreme wind conditions.

Wind power is a rapidly growing segment of the electric power generation industry. A single wind tower utilizes a wind turbine blade to input rotational energy directly into an electric generator to generate and supply electricity to a power grid. The potential energy production of the wind tower corresponds directly to the area swept by the wind turbine blades during rotation. An incremental increase in the length of the wind turbine blades produces a square exponential increase in potential energy production.

Conventional wind turbine blade designs have sought to take advantage of the exponential increase in potential energy production simply by using longer length turbine blades. Manufacturing longer wind turbine blades, however, may not account for the additional mass of the longer length or for the additional expenses associated with manufacturing and transporting longer length turbine blades. Wind turbine blade mass and expense increase with the cube of the wind turbine blade length. Since the increase in potential energy production only increases with the square of the wind turbine blade length, simply making longer length wind turbine blades may not be feasible or economical compared to the cubic relation of length to mass and expense. Furthermore, the added mass may in turn contribute to stress loads on the wind turbine blades and decrease the life of the wind turbine blades.

Another wind turbine blade design utilizes an extendable blade end portion to extend the wind turbine blade length. The extendable blade end portion extends and retracts co-linearly with a blade base portion. The extendable blade end portion may require additional machinery to retract and extend. The additional machinery may add mass and expense to the wind turbine blade and therefore negate the increase in potential energy production from the increased length of the wind turbine blade. Additionally, the added mass may in turn contribute to stress loads on the wind turbine blades and decrease the life of the wind turbine blades.

Accordingly, a turbine blade that provides increased blade length with minimal added mass and machinery is needed.

SUMMARY OF THE INVENTION

A turbine blade according to the present invention has an airfoil shape and includes an inboard blade section with a first longitudinal axis and an outboard blade section with a second longitudinal axis. The inboard and outboard blade sections are moveably connected at a hinge. The outboard blade section is foldable about the hinge and may fold onto the inboard blade section. When the outboard blade is in the process of folding, the second longitudinal axis is transverse to the first longitudinal axis.

The method of moving and folding the outboard blade section relative to the inboard blade section includes utilizing an actuator to adjust the pitch of the rotating turbine blade to change the pressure on a non-hinge side of the turbine blade. This results in the outboard blade section folding with respect to the inboard blade section. Blade pitch actuators are common in wind tower assemblies and utilizing the actuator for the additional purpose of folding the turbine blades eliminates the necessity of additional machinery to fold the turbine blades.

In another turbine blade example, the hinge has a hinge axis that is oriented at a 45° angle relative to a chord axis of the inboard blade section. The hinge allows the outboard blade section to fold to a position such that the second longitudinal axis is perpendicular to the first longitudinal axis.

In another turbine blade example, the hinge axis is oriented non-parallel to a chord axis of the inboard blade section such that when the outboard blade section is fully folded, the inboard blade section is oriented at an angle to the outboard blade section.

The assembly according to the present invention provides a foldable turbine blade for mitigating stresses from extreme wind conditions without the use of additional machinery to actuate the folding.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
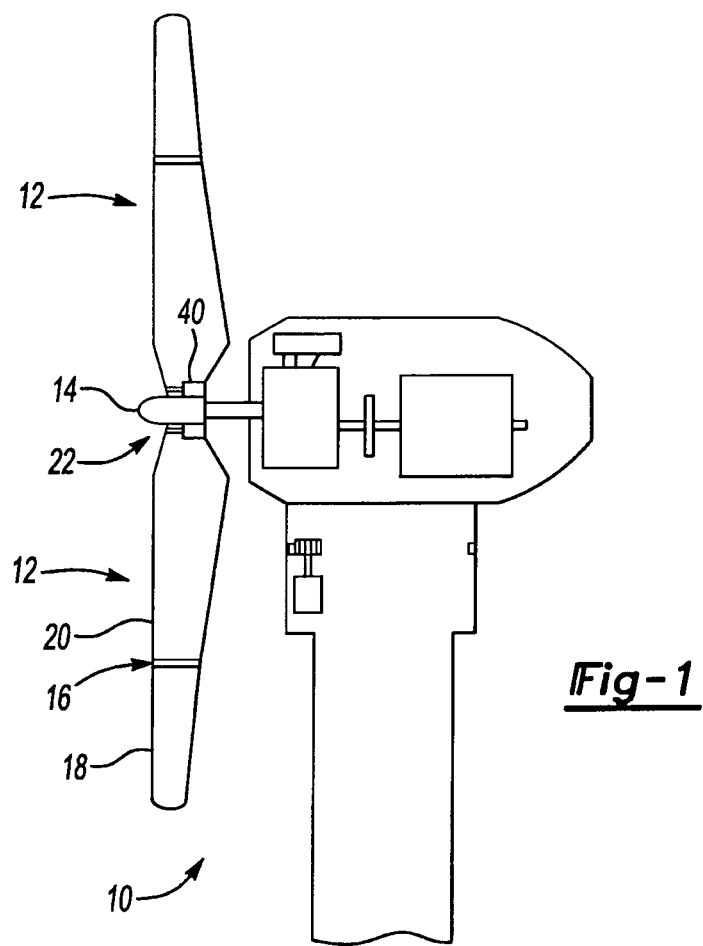
FIG. 1 illustrates a schematic side view of a wind tower for capturing and converting wind energy into electricity.

FIG. 1 illustrates a schematic view of a wind tower 10 for capturing and converting wind energy into electricity. The wind tower 10 includes wind powered turbine blades 12 which rotate about a hub 14. Occasionally, the wind conditions may be too severe to operate the turbine blades 12 without risk of over-stressing and damaging the turbine blades 12. In severe wind conditions such as a heavy storm or hurricane, it may be desirable to mitigate the effects of the severe conditions by folding the turbines blades 12 to a shorter length to lessen the stresses on the blades 12.

For the purpose of folding, the turbine blades 12 each include a joint 16 for folding an outboard blade section 18 onto an inboard blade section 20. By folding the turbine blade 12, the lift forces on the blade 12 are reduced, thereby reducing the stresses produced at the base 22 of the turbine blades 12.

Figure 2:
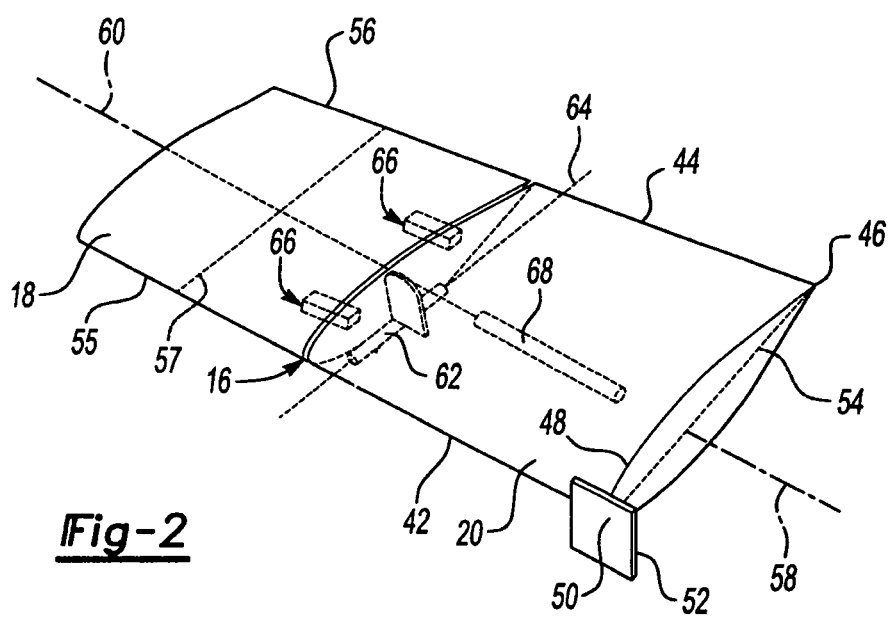
FIG. 2 illustrates a schematic perspective view of the turbine blade of FIG. 1.

FIG. 2 illustrates another schematic view of the turbine blade 12 of FIG. 1. The inboard blade section 20 has an airfoil shape with a first leading edge 42 and a first trailing edge 44. The airfoil shape cross section includes an apex 46 and an arcuate portion 48 which is oppositely located from the apex 46. The arcuate portion 48 includes a point 50 defined by a tangential plane 52. The point 50 and apex 46 define a first chord axis 54 for the inboard blade section. Likewise, the outboard blade section 18 includes a second leading edge 55 and second trailing edge 56 defining a second chord axis 57.

The inboard blade section 20 defines a first longitudinal axis 58 and the outboard blade section 18 defines a second longitudinal axis 60. The first longitudinal axis 58 and second longitudinal axis 60 are generally co-linear when the outboard blade section 18 is in the position illustrated in FIG. 2.

The joint 16 allows the outboard blade section 18 to fold relative to the inboard blade section 20 about a hinge 62. The hinge 62 defines a hinge axis 64. A latch 66 is arranged between the outboard blade section 18 and inboard blade section 20. The latch 66 has a locked and unlocked position. When the latch 66 is in a locked position, the outboard blade section 18 is prevented from rotating about the hinge 62. A damper 68 is mounted between the outboard blade section 18 and inboard blade section 20 for regulating the movement and speed of the outboard blade section 18 when the latch 66 is in an unlocked position.

Figure 3:
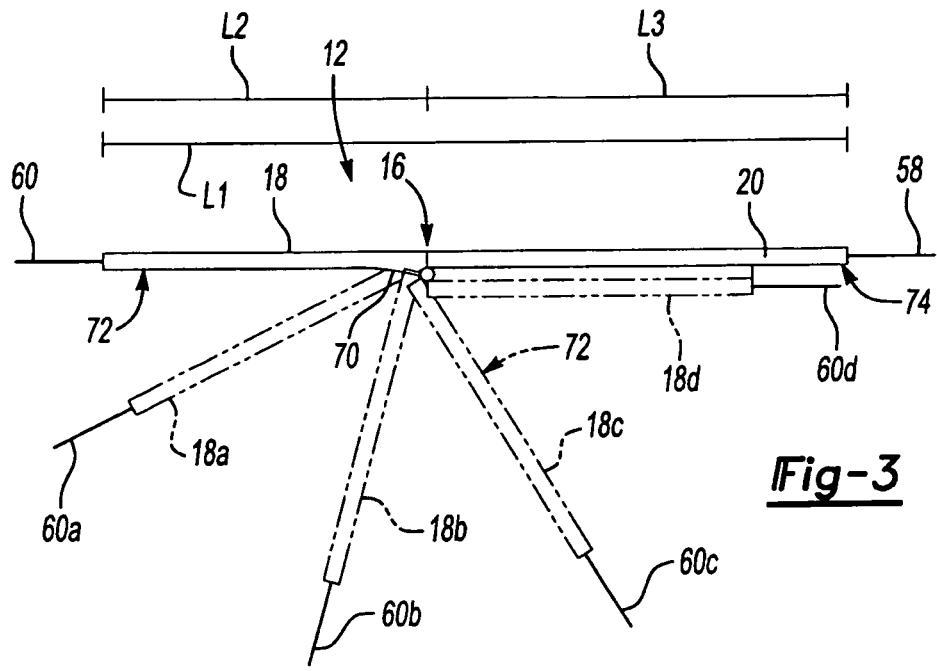
FIG. 3 illustrates another schematic front view of the turbine blade of FIG. 1.

FIG. 3 illustrates a schematic view of the turbine blade 12 of FIG. 1. The outboard blade section 18 and inboard blade section 20 are thicker at the joint 16 to accommodate the hinge 62 and provide reinforcement to the joint 16. The joint 16 includes an aerodynamic surface 70 that provides improved airflow over the surface of the hinge 62, thereby reducing drag on the turbine blade 12. Additionally, the aerodynamic surface 70 has a smooth form in one example and may reduce stress concentrations in the material surrounding the joint 16.

The turbine blade 12 includes a length $L_1$ which comprises the length of the outboard blade section 18, $L_2$, and the length of the inboard blade section 20, $L_3$. In one preferred example, $L_1$ is forty meters, $L_2$ is six meters and $L_3$ is thirty-four meters. Moving the joint 16 and hinge 62 further inboard to increase $L_2$ and decrease $L_3$ increases the stress on the joint 16, increases the risk of failure at the joint 16, and increases the amount of reinforcement required to adequately secure the outboard blade section 18 to the inboard blade section 20 at the joint 16.

In operation, the outboard blade section 18 of the turbine blade 12 is moveable about the joint 16 between a first position and a second position. In one example, the outboard blade section 18 begins in a first position in which the second longitudinal axis 60 is parallel to the first longitudinal axis 58. An outboard blade section 18a and second longitudinal axis 60a represent one possible second position. In the second position, the second longitudinal axis 60a is transverse to the first longitudinal axis 58 of the inboard blade section 20.

In another example, an outboard blade section 18b and second longitudinal axis 60b represent another possible second position. In this second position, the second longitudinal axis 60b is transverse and generally perpendicular to the first longitudinal axis 58 of the inboard blade section 20.

In another example, an outboard blade section 18c and second longitudinal axis 60c represent another possible second position. In this second position, the second longitudinal axis 60c is transverse to the first longitudinal axis 58 and an outer surface 72 of the outboard blade section 18 faces an outer surface 74 of the inboard blade section 20.

In another example, an outboard blade section 18d and second longitudinal axis 60d represent another possible first position. In this first position, which is a fully folded position, the second longitudinal axis 60d is generally parallel to the first longitudinal axis 58 and an outer surface 72 of the outboard blade section 18 faces an outer surface 74 of the inboard blade section 20. Preferably, the outboard blade section 18 is moved to the fully folded position in anticipation of an extreme wind event which may pose risks of over-stressing and damaging the turbine blades 12. It is to be understood that the examples of turbine blade positions are for reference only and are not intended and should not be considered to be limiting.

FIGS. 4A-4F schematically illustrate the turbine blade 12 being folded. The method of moving and folding the outboard blade section 18 relative to the inboard blade section 20 includes adjusting the pitch of a rotating turbine blade 12 to move the outboard blade section 18 of the turbine blade 12 relative to the inboard blade section 20 of the turbine blade 12.

Figure 4A:
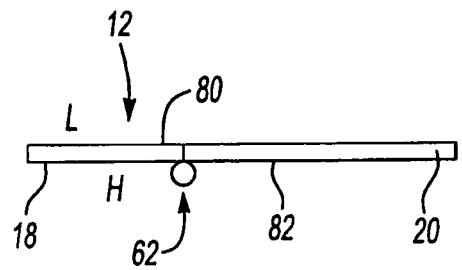
FIG. 4A schematically illustrates the turbine blade before being folded.

Initially, the outboard blade section 18 of the turbine blade 12 is in a first position, as illustrated in FIG. 4A. In this first position, there is low pressure on the non-hinge side 80 which is the side opposite of the hinge 62. The low pressure is designated as "L". There is high pressure on a hinge side 82 which is the side of the hinge 62. The high pressure is designated as "H." The high pressure on the hinge side 82 tends not to rotate the outboard blade section 18 because the hinge is on the side of the high pressure.

Figure 4B:
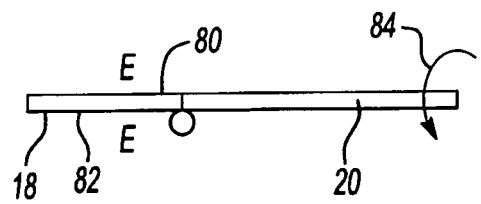
FIG. 4B schematically illustrates the turbine blade of FIG. 4A in a feathered position.

The pitch of the turbine blade 12 is then adjusted in a first direction by an actuator 40 (FIG. 1), represented by the first pitch arrow 84 as illustrated in FIG. 4B. This adjustment brings the turbine blade 12 into a feathered condition. In the feathered condition, there are essentially no lift forces on the turbine blade 12; therefore, the pressure on the non-hinge side 80 is essentially equal to the pressure on the hinge side 82, designated as "E."

Figure 4C:
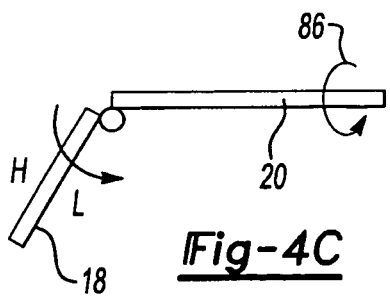
FIG. 4C schematically illustrates the turbine blade of FIG. 4B being folded.
Figure 4D:
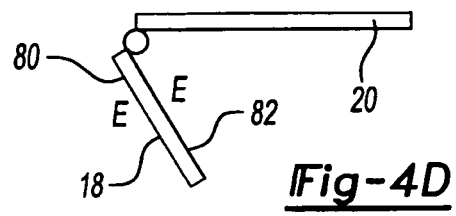
FIG. 4D schematically illustrates the turbine blade of FIG. 4C folded to an intermediate position.

The pitch of the turbine blade 12 is further adjusted past the feathered condition in the first direction, represented by the pitch arrow 86. Pitching past the feathered condition creates high pressure on the non-hinge side 80 and a lower pressure on the hinge side 82. When the latch 66 is unlocked, the high pressure on the non-hinge side 80 causes the outboard blade section 18 to rotate from the first position to a second position, as illustrated in FIG. 4C. As the outboard blade section 18 rotates, the pressures change before the outboard blade section 18 fully folds. As a result, the outboard blade section 18 rotates to an intermediate equilibrium second position between the extended and fully folded position, as illustrated in FIG. 4D. In this intermediate second position there are equal pressures on the non-hinge side 80 and hinge side 82.

Figure 4E:
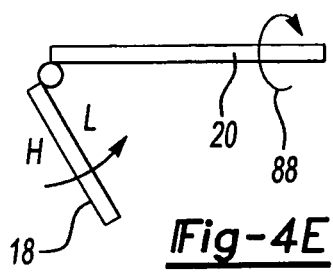
FIG. 4E schematically illustrates the turbine blade folding from the intermediate position in FIG. 4D.
Figure 4F:
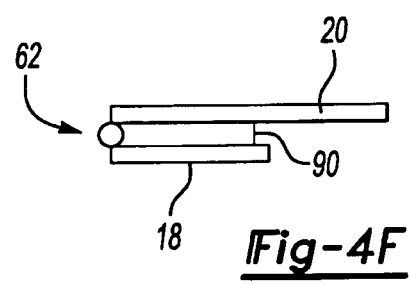
FIG. 4F schematically illustrates the turbine blade of FIG. 4E in a fully folded position.

The pitch of the turbine blade 12 is then adjusted in a second direction that is opposite from the first direction, represented by the pitch arrow 88 as illustrated in FIG. 4E. Pitching in the second direction creates a high pressure on the non-hinge side 80 and a lower pressure on the hinge side 82. The higher pressure causes the outboard blade section 18 to fully fold, as illustrated in FIG. 4F. When fully folded, the outboard blade section 18 is essentially parallel to the inboard blade section 20. That is, the second longitudinal axis 60 is essentially parallel to the first longitudinal axis 58. A latch 90 secures the outboard blade section 18 to the inboard blade section 20 to prevent undesired unfolding. The outboard blade section 18 may be unfolded back to the extended position by performing the above folding method sequentially backward and pitching in opposite directions from the first and second directions. Preferably, the folding of the turbine blade 12 is in an outward direction away from the wind tower 10 to avoid interference between the blades and the tower.

When the turbine blade 12 is in a fully folded position such as illustrated in FIG. 4F, the stresses created on the turbine blade 12 at the hub 14 are reduced compared to when the turbine blade 12 is in the position shown in FIG. 4A. The folded outboard blade section 18 and inboard blade section 20 form a multi-airfoil section (FIG. 8), which has essentially no lift forces. Without lift forces, the moments on the turbine blade 12 at the hub 14 are reduced. Therefore, folding of the turbine blades 12 may mitigate the potentially high stress conditions created by an extreme wind event, such as a storm, hurricane, or other event.

Utilizing the actuator 40 to pitch and fold the turbine blade 12 may provide the advantage of not needing additional machinery to move the outboard blade section 18. Actuators 40 are common in wind towers 10 to adjust the pitch of the turbine blades 12, therefore, since no additional machinery is required, no weight or expense is added to the wind tower 10 due to additional machinery.

Known methods of cyclic blade pitching may additionally be utilized with the foldable turbine blade 12. Due to the changing height position of the turbine blades 12 from the ground during a cycle of rotation, each of the turbine blades 12 may experience variation in wind speed through a cycle of rotation about the hub 14. This may result in various lift forces at different positions along the length $L_1$ of the turbine blade 12. The various lift forces may aggravate stress loads on the turbine blades 12 at the hub 14, thereby increasing fatigue loading.

Cyclic pitching of the turbine blades 12 may mitigate the stress loads on the turbine blades 12 at the hub 14. During cyclic pitching, the pitch of each turbine blade 12 is independently controlled and is varied as a function of position over one rotational cycle. Generally, position sensors and controlling signals may be used to detect the turbine blade 12 positions and adjust the pitch of each individual turbine blade 12 according to wind speed and lift force information provided by various sensors.

Figure 5:
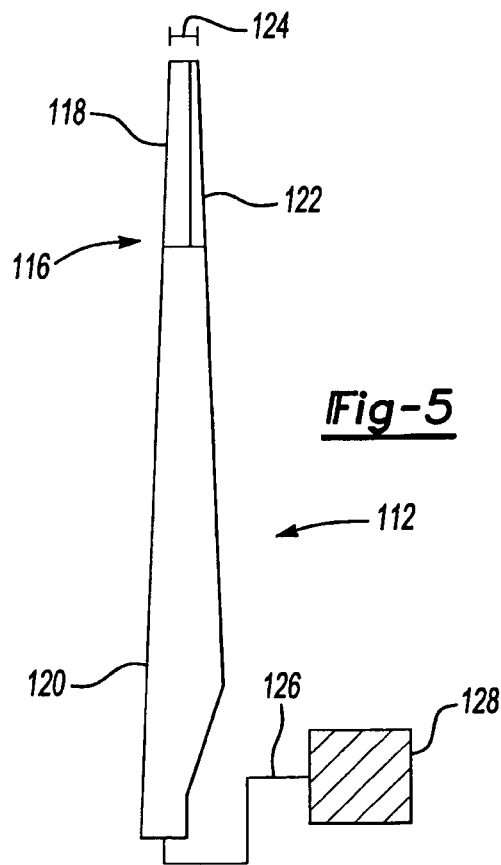
FIG. 5 illustrates a second embodiment of a foldable turbine blade.

FIG. 5 illustrates another embodiment of a foldable turbine blade. The turbine blade 112 includes an outboard blade section 118 and inboard blade section 120 moveably connected at a joint 116. The outboard blade section 118 includes a known chord aileron 122. The chord aileron 122 preferably extends twenty-five to thirty percent of the chord length 124 of the outboard blade section 118. The chord aileron 122 is maneuvered and controlled through a connection 126 with a known aileron actuation system 128. The chord aileron 122 provides rapid control of the lift forces on the turbine blade 112, thereby aiding in mitigation of stresses on the turbine blade 112.

Figure 6:
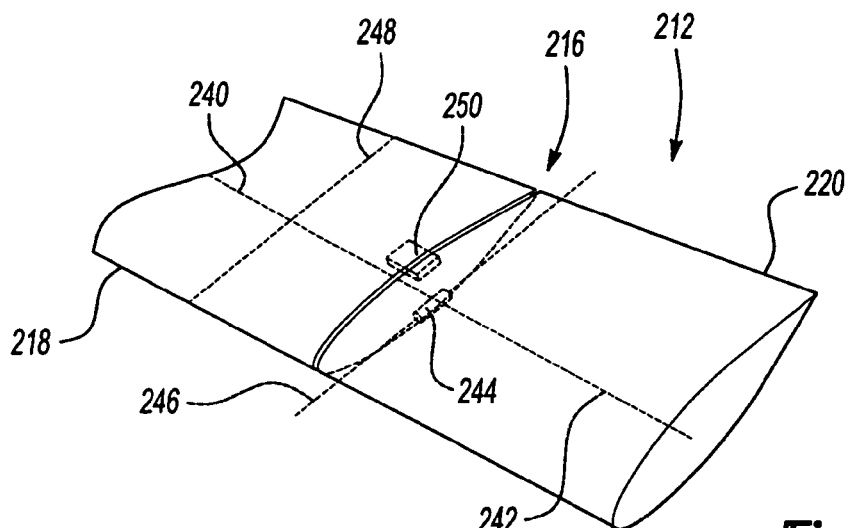
FIG. 6 illustrates a third embodiment of a foldable turbine blade.

FIG. 6 illustrates another embodiment of the foldable turbine blade. The turbine blade 212 includes an outboard blade section 218 and inboard blade section 220 moveably connected at a joint 216. The inboard blade section 220 defines a first longitudinal axis 240 and the outboard blade section 218 defines a second longitudinal axis 242. The joint 216 includes a hinge 244 which defines a hinge axis 246. The hinge axis 246 is oriented at a 45° angle to the relative to the first longitudinal axis 240 and a 45° angle relative to an inboard chord axis 248. A latch 250 is disposed between the outboard blade section 218 and inboard blade section 220. The latch 250 has a locked and unlocked position.

Figure 7A:
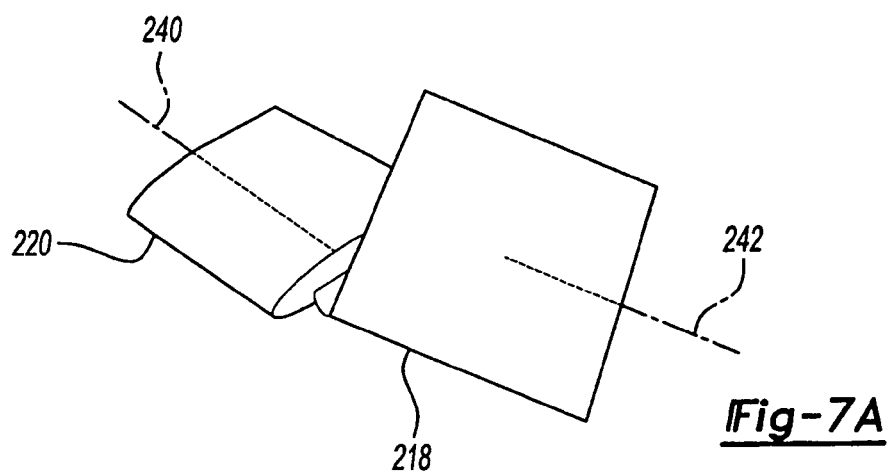
FIGS. 7A-7B illustrate the turbine blade of FIG. 6 as it folds from a first position to a second position.
Figure 7B:
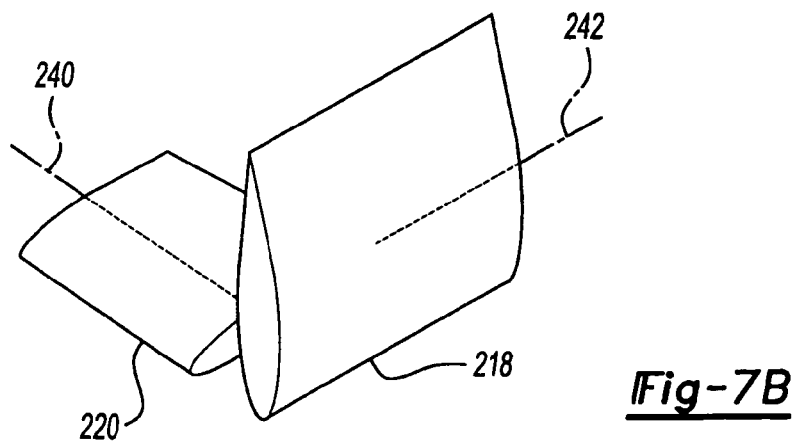

FIGS. 7A-7B illustrate the turbine blade 212 as it folds from a first position to a second position. Unlike other embodiments, the turbine blades 212 are foldable only when the turbine blades 212 are not rotating. First, the latch 250 is unlocked and a force is exerted on the outboard blade section 218. The force folds the outboard blade section 218 into a second position relative to the inboard blade section 220, as illustrated in FIG. 7A. In the second position, the second longitudinal axis 242 is transverse to the first longitudinal axis 240. The outboard blade section 218 is then further folded to a fully folded condition, as illustrated in FIG. 7B. In the fully folded position, the second longitudinal axis 242 is essentially perpendicular to the first longitudinal axis 240.

Figure 8:
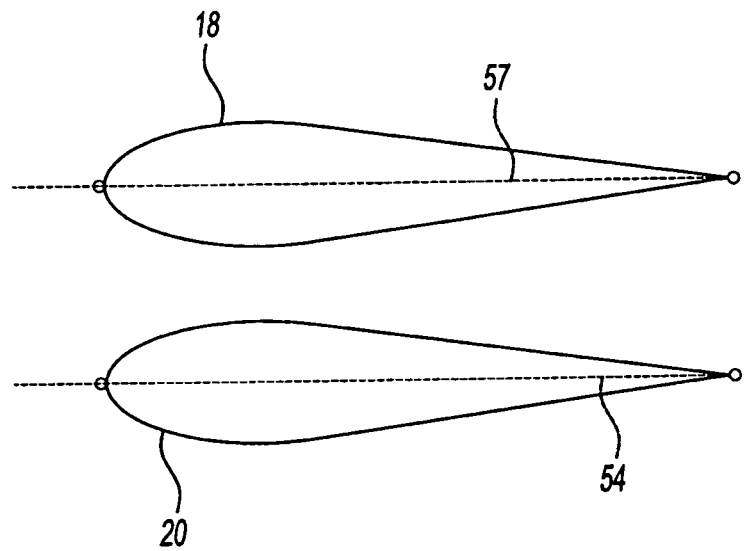
FIG. 8 illustrates a cross-sectional schematic view of the turbine blade of FIG. 2 in a fully folded position.

FIG. 8 illustrates a cross sectional schematic view of the turbine blade 12 of FIG. 2 in a fully folded condition. In the fully folded condition, the first chord axis 54 of the inboard blade section 20 is generally parallel to the second chord axis 57 of the outboard blade section 18. This results from the hinge axis 64 of the hinge 62 being generally parallel to the first chord axis 54.

Figure 9:
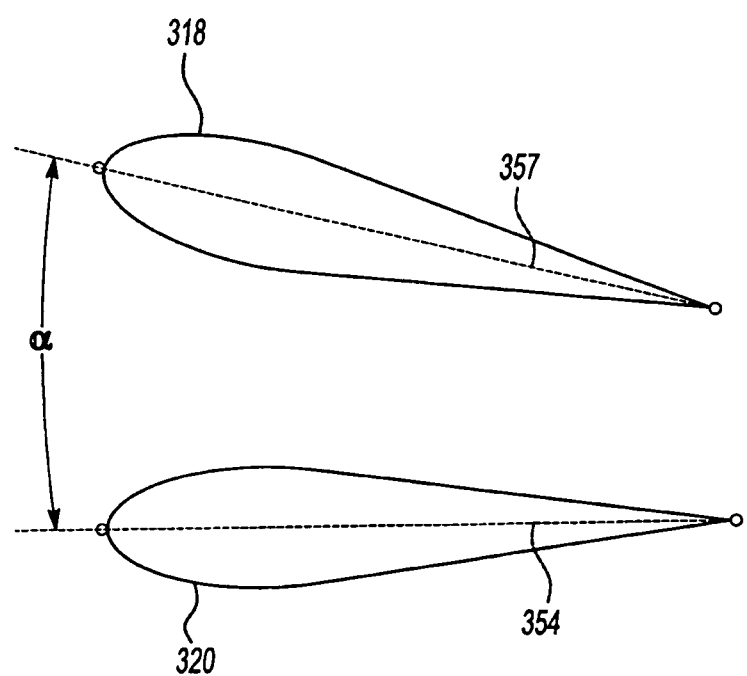
FIG. 9 illustrates a cross-sectional schematic view of a fourth embodiment of a turbine blade in a fully folded position.
Figure 9A:
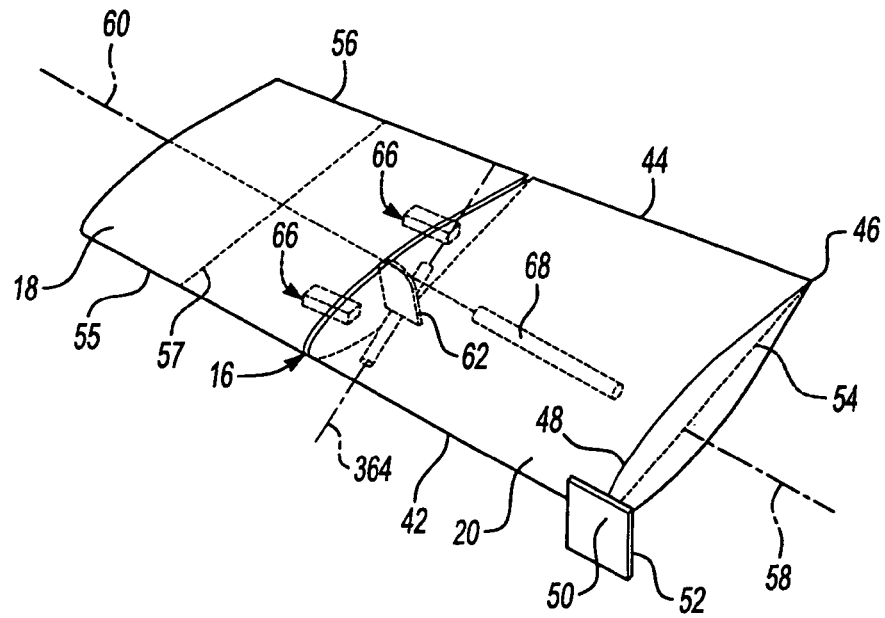
FIG. 9A illustrates a schematic perspective view of the fourth embodiment of the turbine blade.

FIGS. 9 and 9A illustrate a cross sectional schematic views of another embodiment of a turbine blade in a fully folded condition. In this fully folded condition, a first chord axis 354 of an inboard blade section 320 is oriented at an angle alpha to the second chord axis 357 of the outboard blade section 318. This results from utilizing a hinge axis 364 (FIG. 9A) of the hinge 62 that is non-parallel to the first chord axis 354. Preferably, the hinge axis 364 is such that an angle alpha of approximately 14° is produced, although other angles may be successfully utilized. At approximately a 14° angle, the drag on the inboard blade section 320 and outboard blade section 318 is thought to be minimized compared to the drag on the inboard blade section 20 and outboard blade section 18 of FIG. 8. The airflow between the inboard blade section 20 and outboard blade section 18 is thought to be turbulent, thereby increasing drag. The airflow between the inboard blade section 320 and outboard blade section 318 is thought to be laminar, thereby leading to reduced drag.

Figure 10:
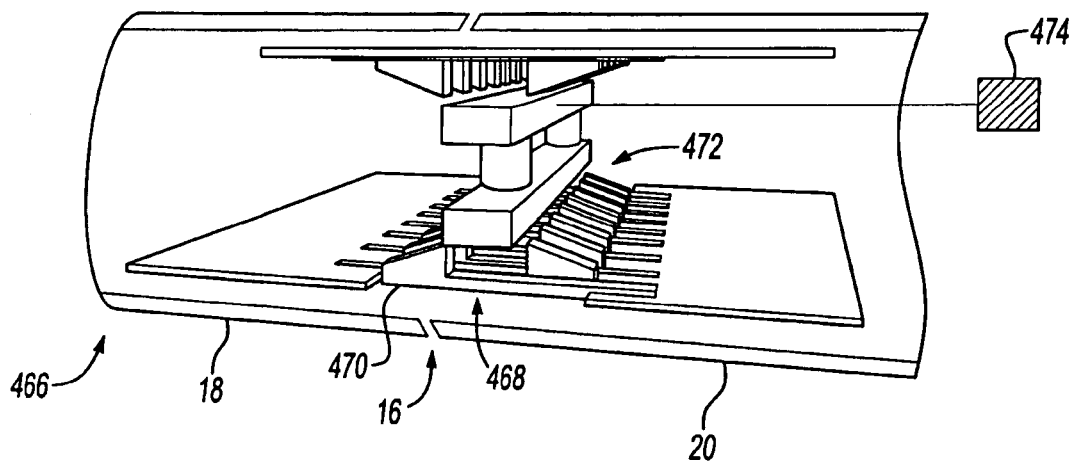
FIG. 10 illustrates a perspective view of a preferred latch system of the inventive turbine blade.

FIG. 10 illustrates a perspective view of an example latch system 466 of the inventive turbine blade. The latch system 466 is located in a similar position to latch 66, as illustrated in FIG. 2, between the outboard blade section 18 and inboard blade section 20. The latch system 466 includes a plurality of interlocking fingers 468. Each of the interlocking fingers 468 includes an engaging end 470 which respectively engages and disengages a locking element 472 when transferring from a locked position to an unlocked position.

In operation, a switch 474 triggers the locking element 472 to engage or disengage the interlocking fingers 468, thereby locking or unlocking the outboard blade section 18. The switch 474 includes a mechanical, electrical, or pneumatic switching mechanism to trigger the locking element 472, however, other switching or actuation systems may also be utilized. When the latch system 466 is in a locked position, the engaging ends 470 of the interlocking fingers 468 exert a compressive force on the locking element 472. Shear forces are generated in the engaging ends 470. Therefore, the locking element 472 and engaging ends must be made robust enough to withstand such forces. The latch system 466 may provide the advantage of withstanding the potentially significant amounts of stress at the joint 16 due to bending moments and the like exerted on the joint 16 from the outboard blade section 18.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A turbine assembly comprising:
   an inboard blade section; and
   an outboard blade section coupled to said inboard blade section for corotation with said inboard blade section in a rotational plane about a fulcrum, said outboard blade section and said inboard blade section each having an airfoil shape, said outboard blade section being radially outward of said inboard blade section relative to said fulcrum, said outboard blade section being moveable between a first position within said rotational plane and a second position folded toward said fulcrum and said inboard blade section and transverse to said rotational plane.

2. The assembly as recited in claim 1, wherein said inboard blade section and said outboard blade section include a first outer face and a second outer face, respectively, said first outer face facing said second outer face when said inboard blade section is in said second position.

3. The assembly as recited in claim 1, further comprising a joint between said inboard blade section and said outboard blade section, said joint providing rotatable communication of said outboard blade section between said first position and said second position.

4. The assembly as recited in claim 3, wherein said joint comprises an aerodynamic surface.

5. The assembly as recited in claim 1, wherein said outboard blade section is moveable between said first position and said second position while said inboard blade section and said outboard blade section rotate around a hub.

6. The assembly as recited in claim 1, further comprising a latch between said inboard blade section and said outboard blade section, said latch having a locked position and an unlocked position.

7. The assembly as recited in claim 1, further comprising a damper mounted between said inboard blade section and said outboard blade section for regulating movement of said outboard blade section between said first position and said second position.

8. The assembly as recited in claim 1, further comprising an actuator providing pitch adjustment of said inboard blade section and said outboard blade section.

9. The assembly as recited in claim 1, wherein said airfoil shape includes an apex and an arcuate portion opposite said apex, said arcuate portion including a point defined by a tangential plane, and said point and said apex on each of said inboard blade section and said outboard blade section defining a first chord axis and a second chord axis, respectively.

10. The assembly as recited in claim 1, wherein the fulcrum comprises a hub.

11. The assembly as recited in claim 1, wherein the inboard blade section is entirely radially inwards of the outboard blade section and the outboard blade section is entirely radially outwards of the inboard blade section when the outboard blade section is in the first position.

12. The assembly as recited in claim 1, wherein the fulcrum is located proximate an inboard end of the inboard blade section, and the outboard blade section is coupled to an outboard end of the inboard blade section.

13. A method of moving an outboard section of a rotating turbine blade relative to an inboard section of the rotating turbine blade wherein the inboard blade section corotates with the outboard blade section in a rotational plane about a fulcrum, the method comprising the steps of:
    mechanically actuating the rotating turbine blade to change a pitch of the rotating turbine blade; and
    folding the outboard blade section of the rotating turbine blade toward the fulcrum and the inboard blade section of the rotating turbine blade in response to the change in the pitch.

14. The method as recited in claim 13, further comprising the step of moving the outboard blade section from a first position which is parallel to the inboard blade section to a second position which is transverse to the inboard blade section.

15. The method as recited in claim 13, further comprising the step of unlocking a latch to release the outboard blade section.

16. The method as recited in claim 13, further comprising the step of pitching the rotating turbine blade in a first direction to produce a positive pressure which moves the outboard blade section from a first position to an intermediate position between the first position and a second position.

17. The method as recited in claim 16, further comprising the step of pitching the rotating turbine blade in a second direction opposite to the first direction to produce a negative pressure which moves the outboard blade from the intermediate position to the second position.

18. The method as recited in claim 17, further comprising the step of securing the outboard blade section in the second position.

19. The method as recited in claim 13, wherein adjusting the pitch comprises rotating the rotating turbine blade about a longitudinal axis of the rotating turbine blade.

* * * * *